(12) United States Patent
Jin et al.

(10) Patent No.: US 12,269,481 B2
(45) Date of Patent: Apr. 8, 2025

(54) ELECTRIC VEHICLE STATE CONTROL METHOD AND DEVICE

(71) Applicant: Hyundai Kefico Corporation, Gyeonggi-do (KR)

(72) Inventors: Sil Lo Jin, Gyeonggi-do (KR); In Keun Seo, Gyeonggi-do (KR); Se Hee Byun, Seoul (KR); Hyun Seung Kim, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 207 days.

(21) Appl. No.: 17/912,269

(22) PCT Filed: Mar. 17, 2021

(86) PCT No.: PCT/KR2021/003303
§ 371 (c)(1),
(2) Date: Sep. 16, 2022

(87) PCT Pub. No.: WO2021/187892
PCT Pub. Date: Sep. 23, 2021

(65) Prior Publication Data
US 2023/0146868 A1    May 11, 2023

(30) Foreign Application Priority Data
Mar. 18, 2020 (KR) ........................ 10-2020-0033141

(51) Int. Cl.
*B60W 40/08* (2012.01)
*B60W 10/08* (2006.01)
*B60W 50/16* (2020.01)

(52) U.S. Cl.
CPC ............ *B60W 40/08* (2013.01); *B60W 10/08* (2013.01); *B60W 50/16* (2013.01); *B60W 2540/227* (2020.02)

(58) Field of Classification Search
CPC ...... B60W 40/08; B60W 10/08; B60W 50/16; B60W 2540/227; B60W 10/06;
(Continued)

(56) References Cited

U.S. PATENT DOCUMENTS 5,635,903 A * 6/1997 Koike .................... B60Q 5/008
2002/0082754 A1* 6/2002 Robichaux ............ B60W 50/16
(Continued)

FOREIGN PATENT DOCUMENTS

JP      H09 169292 A      6/1997
JP      2005006437 A  *   1/2005
(Continued)

OTHER PUBLICATIONS

Machine Translation of JP-2007028816-A; "Vehicle Starter" (Year: 2007).*
(Continued)

*Primary Examiner* — Ramon A. Mercado
*Assistant Examiner* — Ellis B. Ramirez
(74) *Attorney, Agent, or Firm* — Fox Rothschild LLP

(57) ABSTRACT

An electric vehicle state control device of the present disclosure relates to an electric vehicle state notification device having, as states for operation safety related to parking/stopping, a key-on state in which a throttle is inactivated, a startup state in which the throttle is activated, and a driving state, and may comprise: a driving parameter confirmation unit for collecting measurement values of parameters related to the driving of an electric vehicle; a driving state determination/transition unit for determining the driving state of the electric vehicle from the collected measurement values of parameters related to the driving; and a driver notification unit for intuitively notifying a driver of the determined driving state of the electric vehicle.

16 Claims, 10 Drawing Sheets

(58) Field of Classification Search
CPC .. B60L 15/20; B60L 2200/12; B60L 2240/12; B60L 2250/10; B60L 2260/26; B60Q 5/008
USPC .......................................... 701/22; 340/425.5
See application file for complete search history.

(56) References Cited

U.S. PATENT DOCUMENTS

| | | | |
|---|---|---|---|
| 2009/0079262 A1* | 3/2009 | Ohtomo | B60L 53/11 |
| 2012/0242467 A1* | 9/2012 | Fujii | G10K 15/02 |
| 2017/0043713 A1* | 2/2017 | Sun | B60Q 5/008 |
| 2017/0123754 A1* | 5/2017 | Kwon | G06F 3/165 |
| 2017/0247042 A1* | 8/2017 | Seidl | B60W 30/18145 |
| 2017/0274888 A1* | 9/2017 | Suzuki | B60K 6/445 |

FOREIGN PATENT DOCUMENTS

| | | |
|---|---|---|
| JP | 2006304509 A * | 11/2006 |
| JP | 2007-28816 A | 2/2007 |
| KR | 10-2011-0060504 A | 6/2011 |
| KR | 10-2012-0000861 A | 1/2012 |
| KR | 10-2017-0005588 A | 1/2017 |

OTHER PUBLICATIONS

Machine Translation of JP-H09169292-A1; "Motor-Driven Vehicle and Driving Method Thereof" (Year: 1997).*
International Search Report issued on Jun. 30, 2021 in corresponding PCT Application No. PCT/KR2021/003303.

* cited by examiner

[FIG. 1]
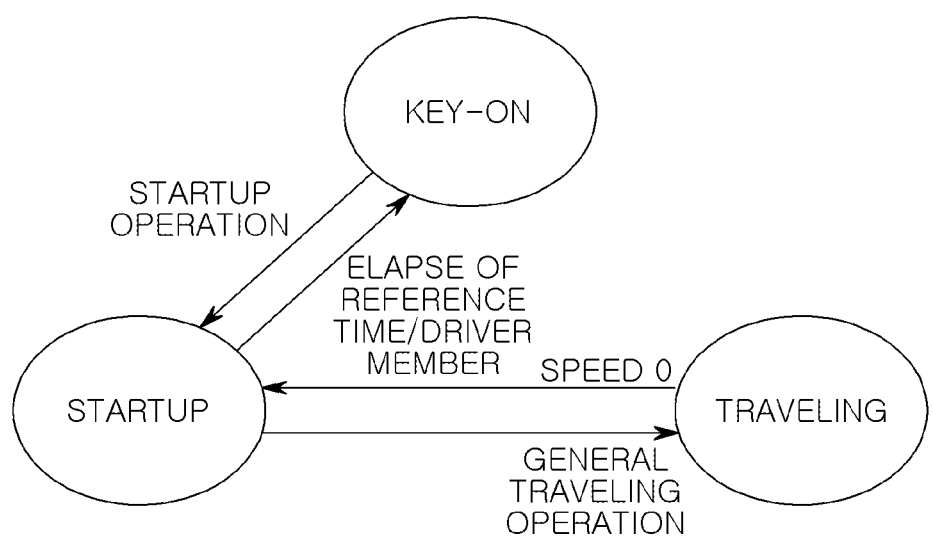

[FIG. 2A]
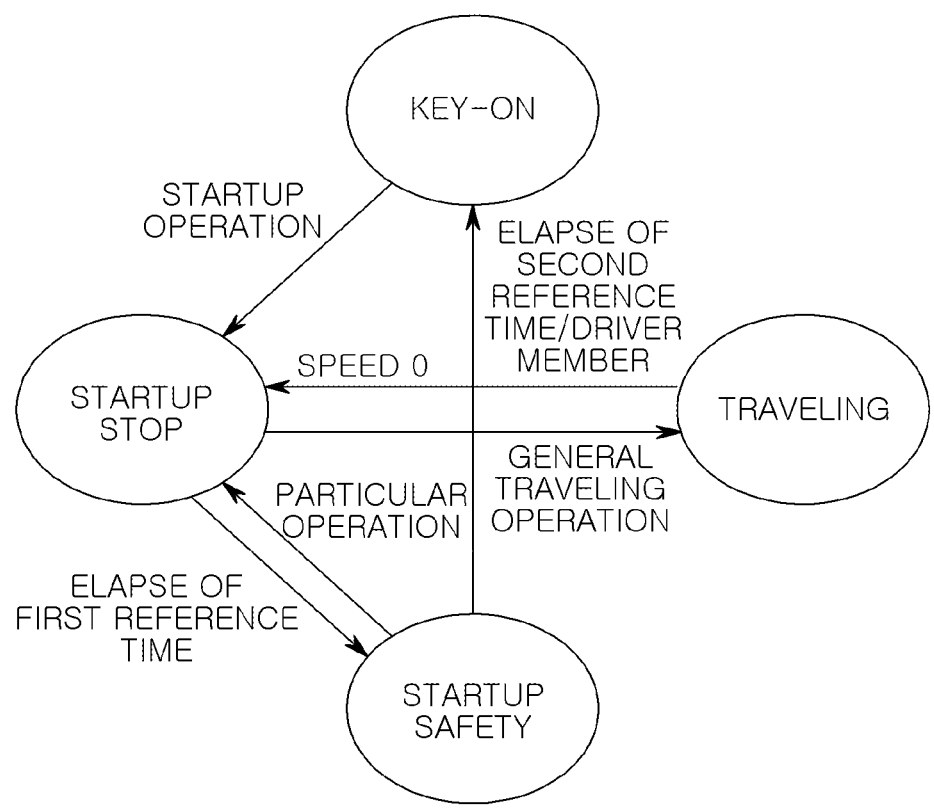

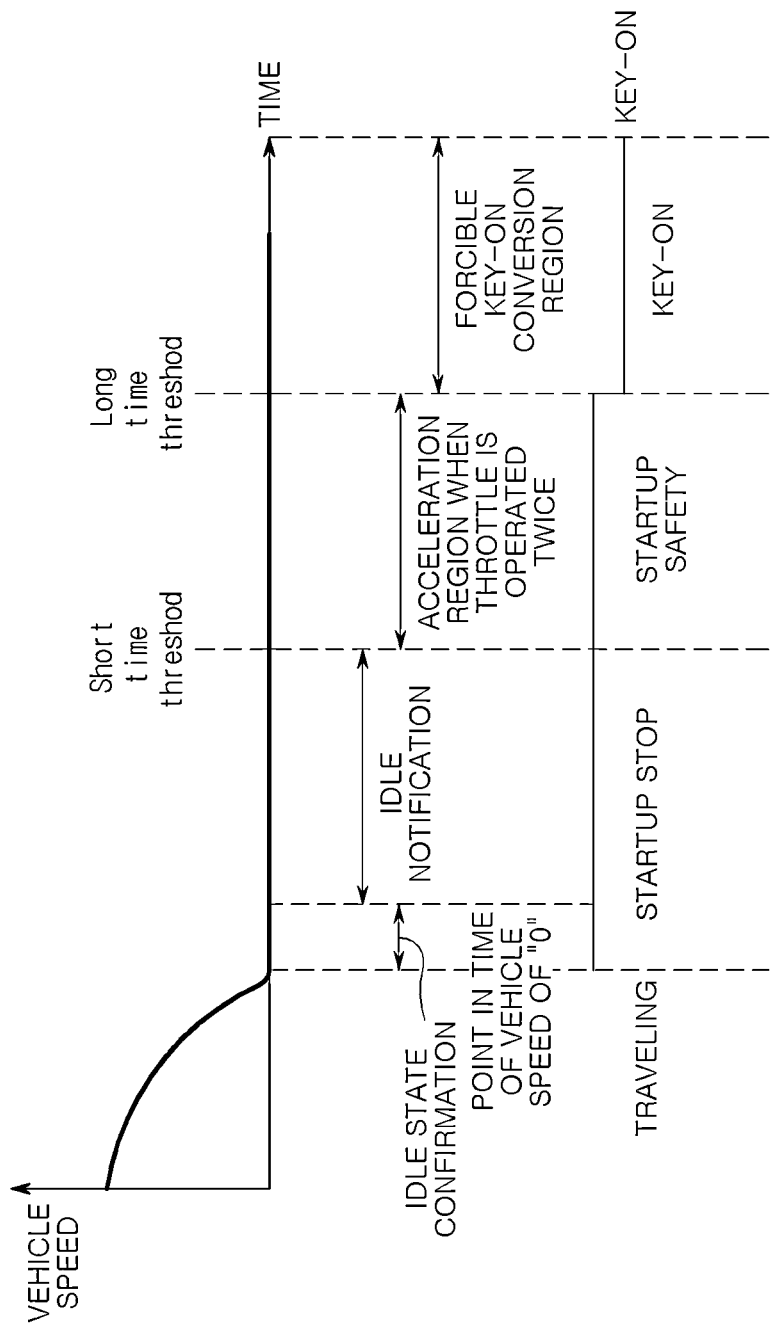
[FIG. 2B]

[FIG. 3]
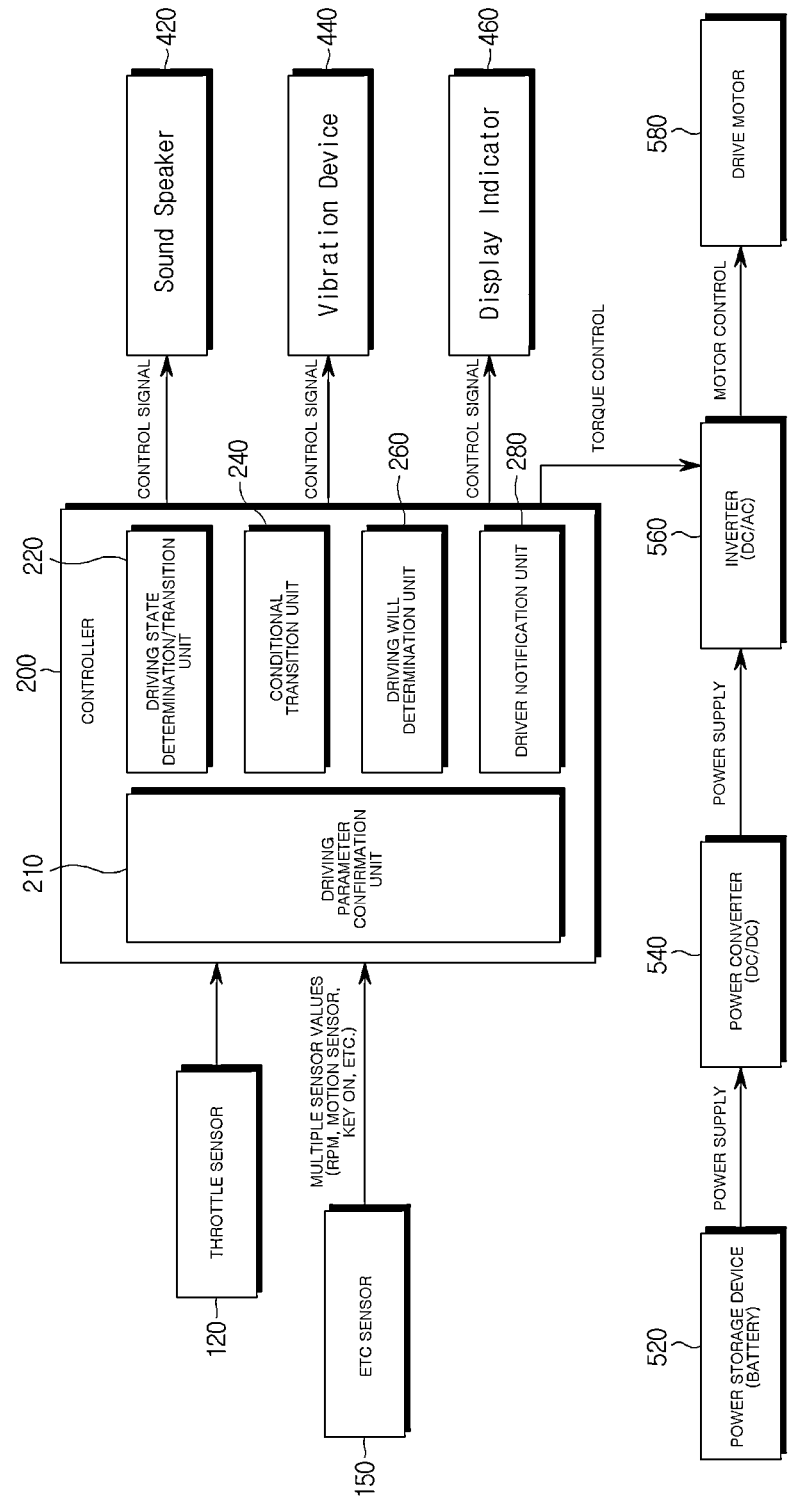

[FIG. 4]
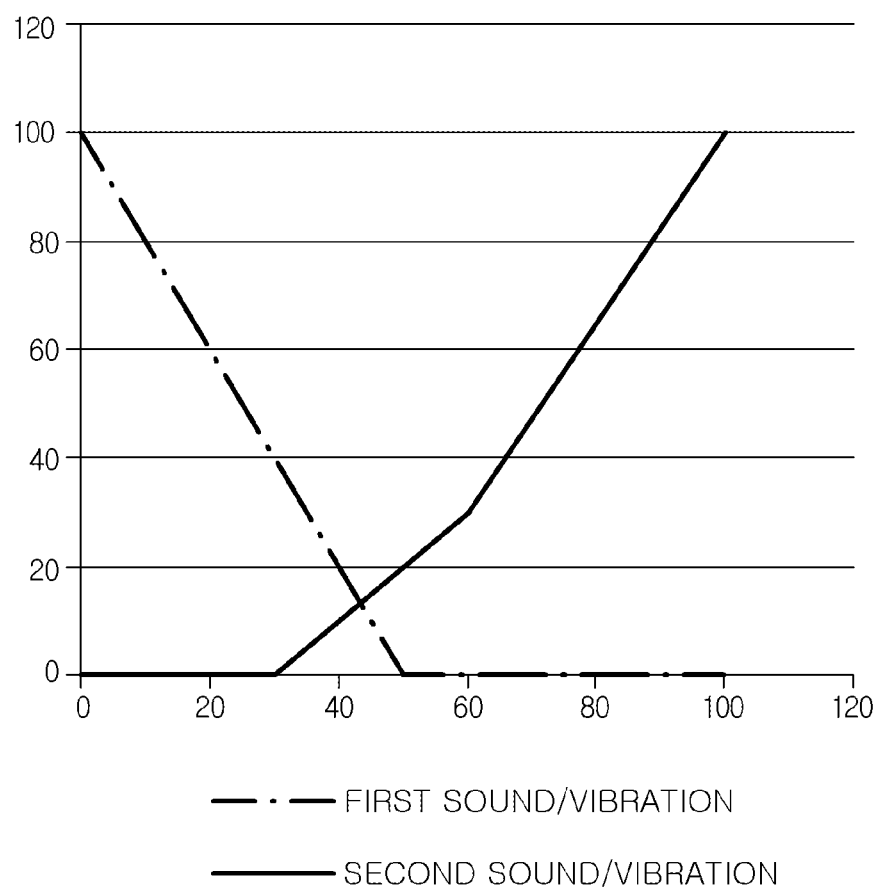

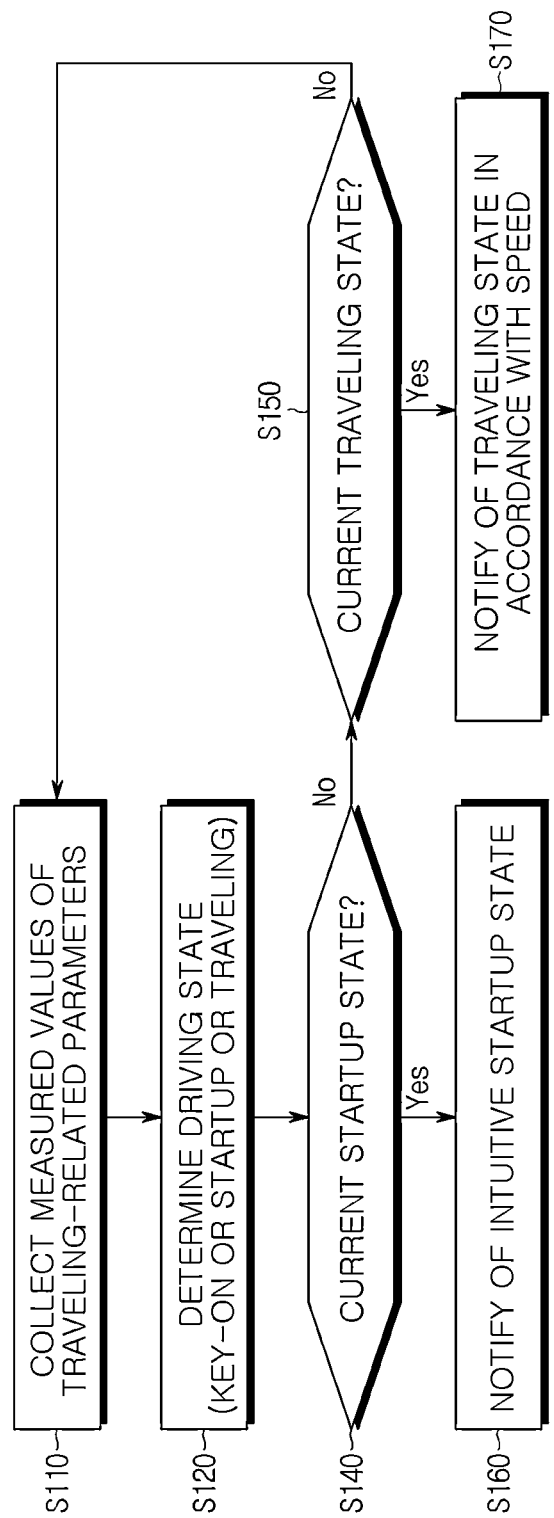

[FIG. 6]
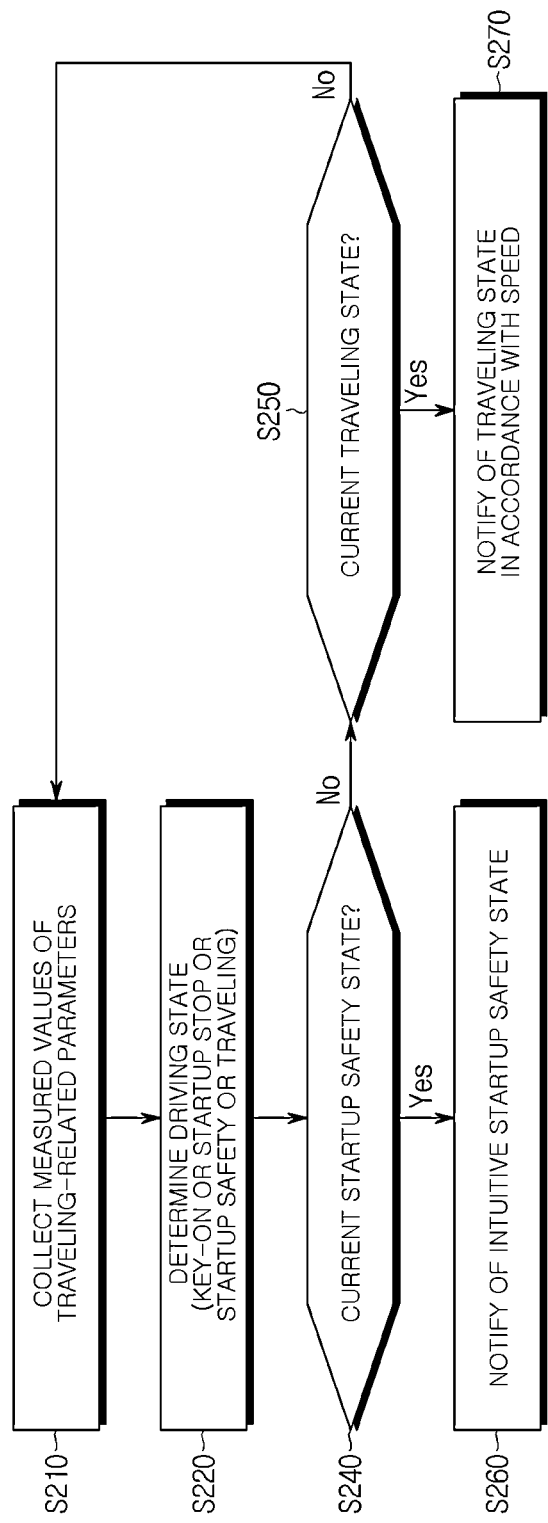

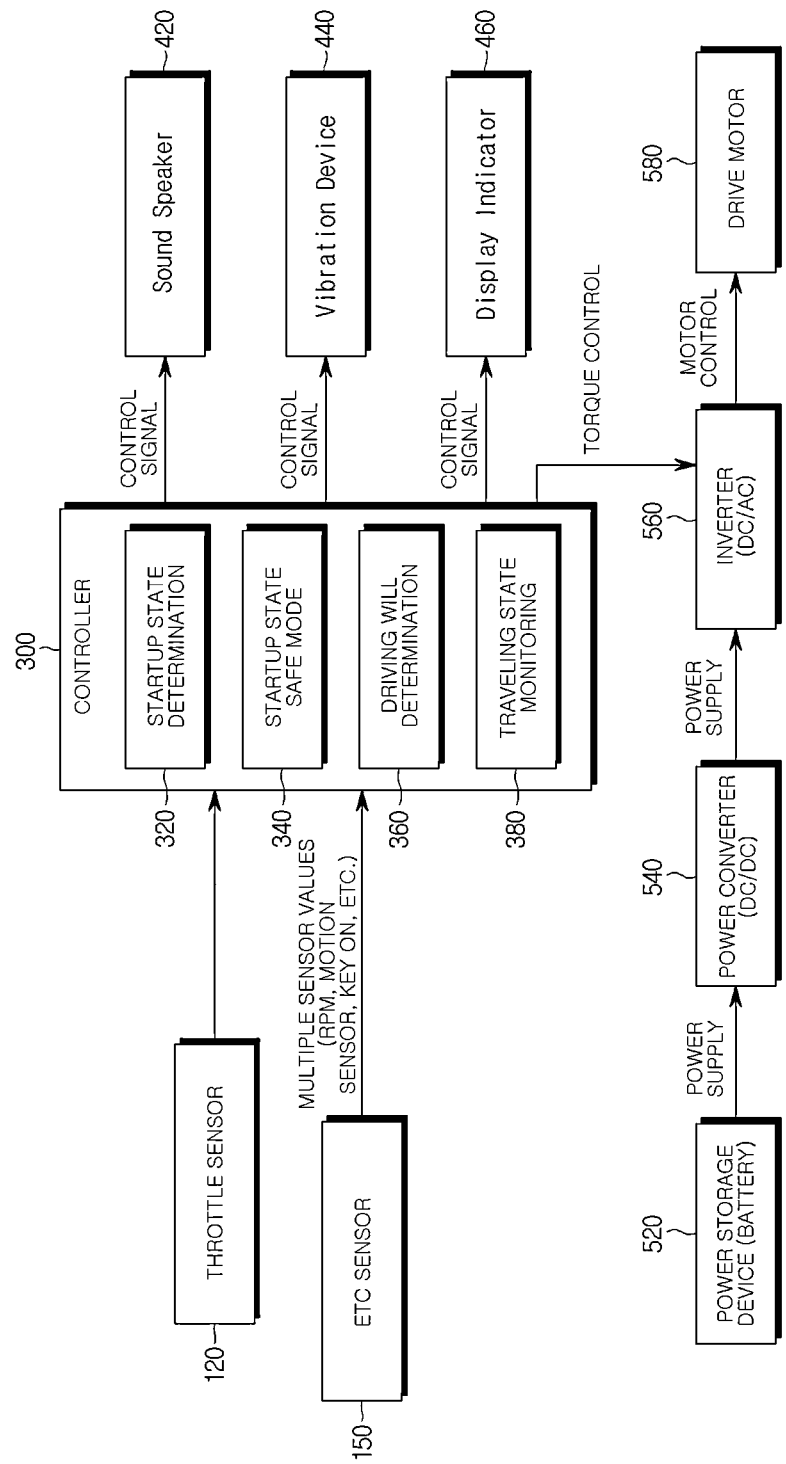
[FIG. 7]

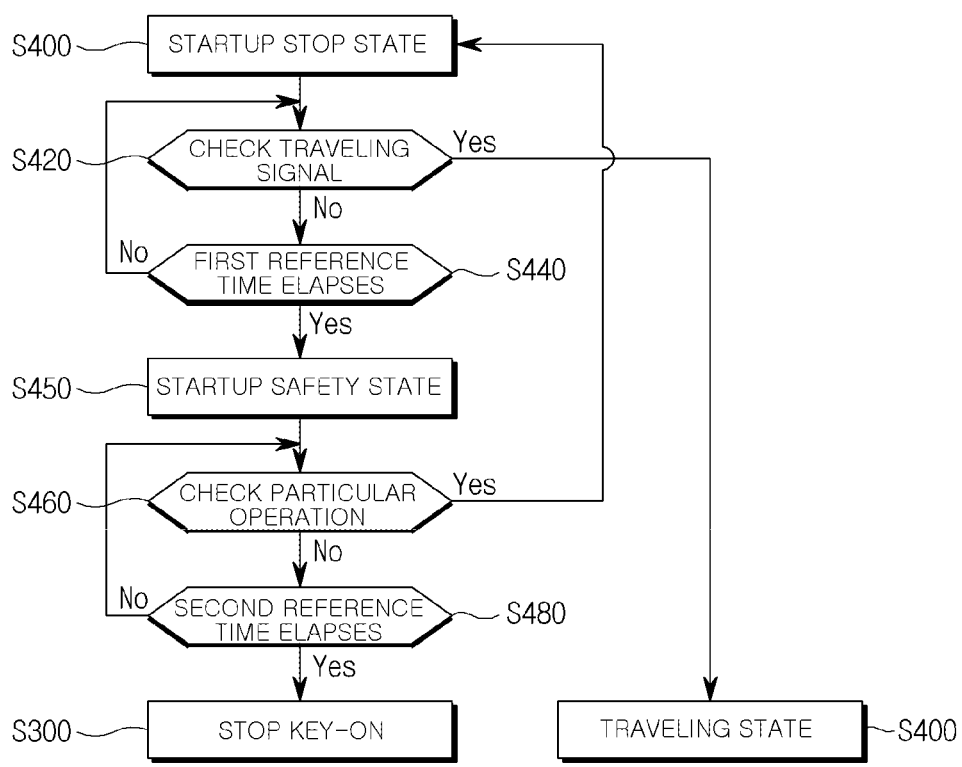
[FIG. 8]

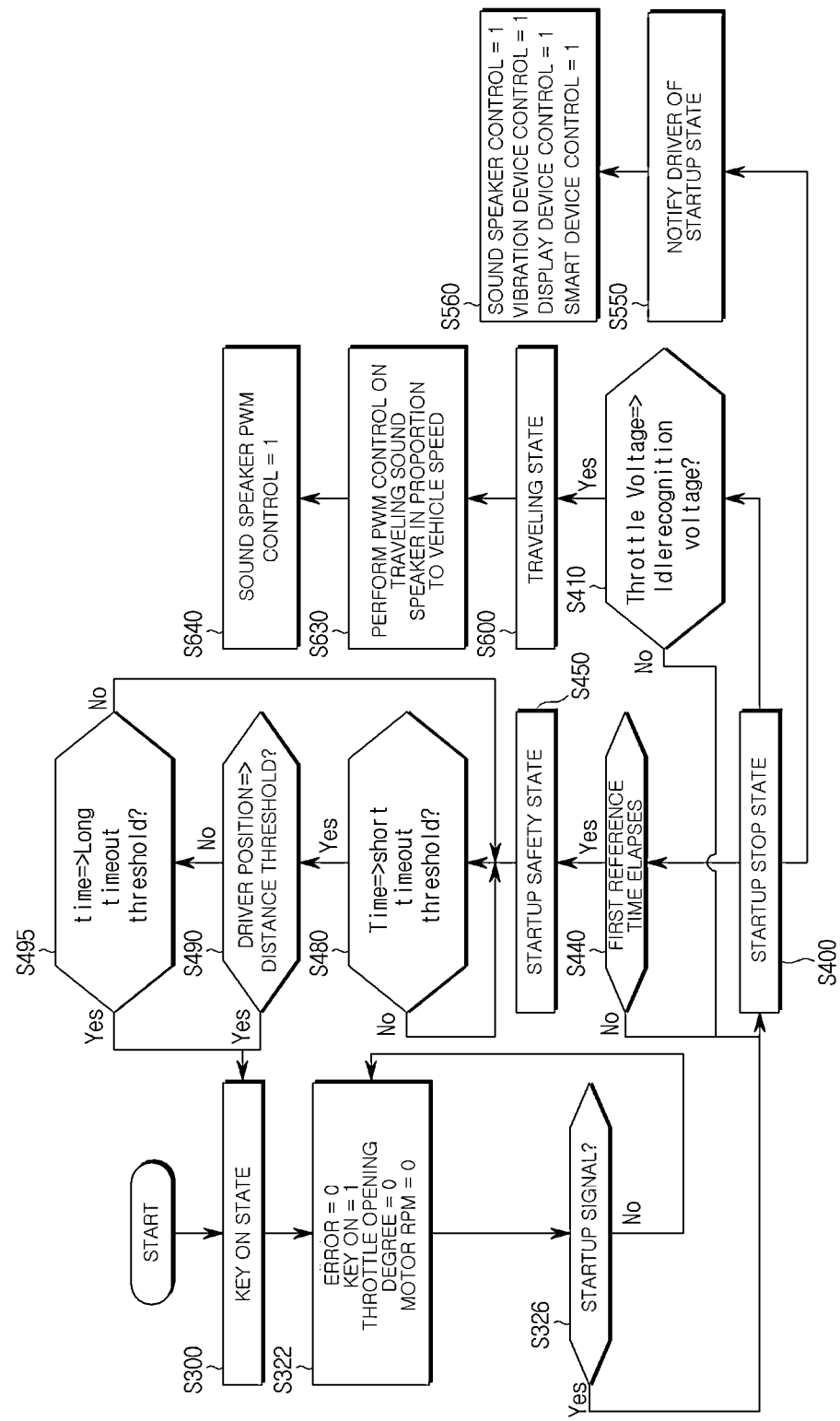

ELECTRIC VEHICLE STATE CONTROL METHOD AND DEVICE

CROSS-REFERENCES TO RELATED APPLICATIONS

This application is a U.S. National Stage Entry of the International Patent Application No. PCT/KR2021/003303 filed on Mar. 17, 2021, which claims the benefit of priority of Korea Patent Application No. 10-2020-0033141 filed on Mar. 18, 2020, which are incorporated herein by reference in their entirety.

TECHNICAL FIELD

The present disclosure relates to an electric vehicle state control device, an electric vehicle state control method using the device, and an electric vehicle state notification method using the device.

BACKGROUND ART

Recently, the use of internal combustion engines, which are sources of harmful gases, has been avoided to protect the global environment, and electric vehicles, which operate by using electric power, i.e., non-polluting power, have attracted attention.

In general, the electric vehicle refers to a vehicle that obtains power by operating an AC or DC motor by mainly using power of a battery. Various technologies for commercializing electric vehicles have been studied and developed. In particular, motor/control technologies have been developed to develop high output, small-scale systems with high efficiency, and particularly, electric motors have been actively studied and developed.

Such an electric vehicle is equipped with a storage battery and uses the power of the storage battery as a power source. The electric vehicle may be used for various purposes such as small-scale electric scooters, electric wheelchairs, and golf carts.

The electric vehicle uses the electric motor instead of an internal combustion engine. The electric motor, which may stop operating without energy consumption in a stopped state, may rapidly improve energy efficiency but increases a likelihood that a driver who is accustomed to the internal combustion engine will make a mistake.

In particular, if the engine sound of a comparatively small vehicle such as a two-wheel electric vehicle similar to a vehicle using the internal combustion engine in the related art is loud, which may cause a serious risk. To prevent this risk, arbitrarily made engine sound is sometimes outputted through a sound speaker or the like. This method only notifies the driver of an idle state (startup state) but cannot prevent the driver from inadvertently operating a throttle in an idle state.

In the case of an internal combustion engine vehicle, when a driver is on standby in an idling state for a comparatively long period of time and then starts moving the vehicle, the driver consistently hears engine sound and feels vibration, and thus the driver may intuitively confirm the idling state. However, in the case of the electric vehicle, when the driver is on standby for a comparatively long period of time in an idling state and then starts moving the vehicle, the driver cannot distinguish between a situation in which the vehicle starts moving and a situation in which the vehicle initially starts moving after the driver gets in the vehicle.

However, in the case of most electric vehicles, because a capacitor of an inverter for operating the motor is charged with power in the idling state, a reaction speed is remarkably higher than a reaction speed in an initial starting situation.

Therefore, there is a need to develop a device or method capable of providing notification so that the driver may recognize that the electric vehicle is in the idling state.

In addition, there is a need to develop a device or method capable of controlling the electric vehicle to prevent a dangerous situation such as over-speeding quick start caused by the driver's inexperienced driving in a situation in which the electric vehicle starts moving after being stopped over a long period of time.

DISCLOSURE

Technical Problem

An object of the present disclosure is to provide an electric vehicle state control device and an electric vehicle state notification method using the same, which enable a driver to intuitively recognize a state of a vehicle in a long-term idling situation.

In addition, another object of the present disclosure is to provide an electric vehicle state control device and an electric vehicle state notification method, which enable a driver to intuitively recognize a traveling state of a vehicle even while the electric vehicle travels.

In addition, still another object of the present disclosure is to provide an electric vehicle state control device and an electric vehicle state notification method, which may prevent a driver from forgetting a state in which a startup key is turned on and a vehicle is stationary for a long period of time.

In addition, yet another object of the present disclosure is to provide an electric vehicle state control device and an electric vehicle state notification method, which may notify a driver of an idle state of a vehicle and change a state of a vehicle to a safe state when it is determined that the driver has no driving will.

Technical Solution

The present disclosure provides an electric vehicle state control device, which has states for operation safety related to parking/stopping, the states including a key-on state in which a throttle is inactivated, a startup state in which the throttle is activated, and a traveling state, the electric vehicle state control device including: a driving parameter confirmation unit configured to collect measured values of parameters related to traveling of the electric vehicle; a driving state determination/transition unit configured to determine a driving state of the electric vehicle based on the measured values of the parameters related to the traveling; and a driver notification unit configured to intuitively notify a driver of the determined driving state of the electric vehicle.

In this case, the electric vehicle state control device may further include a driving will determination unit configured to determine the driver's driving will.

In addition, the driver notification unit may include a vibration element installed on a portion that adjoins the driver's chin among portions of an inner surface of a helmet worn by the driver.

In addition, when the electric vehicle is in the traveling state, the driver notification unit may notify the driver that the electric vehicle is in the traveling state by means of vibration and sound information combined in accordance with a vehicle speed.

In addition, the combined vibration and sound information may include: a first combination close to information sound; and a second combination close to traveling sound, the driver notification unit may notify the driver of the first combination inversely proportional to the vehicle speed in a low-speed section, and the driver notification unit may notify the driver of the second combination proportional to the vehicle speed in a high-speed section.

The driving state determination/transition unit may divide the startup state of the electric vehicle into a startup stop state and a startup safety state and determine the startup stop state and the startup safety state, and the electric vehicle state control device may further include a conditional transition unit configured to change a vehicle state to the startup safety state when a time for which the vehicle is stationary in the startup stop state exceeds a predetermined short reference time and change the vehicle state from the startup safety state to the startup stop state in accordance with a particular operation of the driver.

In addition, the driver notification unit may intuitively notify the driver of the startup safety state when the driver notification unit determines that the driver has a driving will when the electric vehicle is in the startup safety state.

In addition, the conditional transition unit may change the vehicle state from the startup safety state to the startup stop state when the throttle of the electric vehicle is continuously operated twice within a predetermined time.

In addition, the conditional transition unit may change the vehicle state from the startup safety state to the startup stop state when an operation required to change the vehicle state from the key-on state to the startup stop state is applied in the startup safety state.

Another embodiment of the present disclosure provides an electric vehicle state notification method of notifying a driver of a state of an electric vehicle to safely operate the electric vehicle, the electric vehicle state notification method including: collecting measured values of parameters related to traveling of the electric vehicle; determining a driving state of the electric vehicle based on the collected measured values of the parameters related to the traveling; and intuitively notifying the driver of the determined driving state of the electric vehicle, in which the driving state is divided into a key-on state in which a throttle is inactivated, a startup state in which the throttle is activated, and a traveling state.

In this case, the startup state may be divided into a startup stop state in which the throttle is operated in the same way as the traveling state, and a startup safety state in which the throttle is operated by a particular operation.

In addition, when it is determined that the driver has a driving will when the electric vehicle is in the startup safety state, the intuitively notifying may notify the driver of the startup safety state through vibration and sound information.

In addition, the electric vehicle state notification method may further include notifying the driver of the traveling state when the determined driving state is the traveling state.

The notifying of the traveling state may notify the driver of a combination of vibration and sound close to information sound and inversely proportional to a vehicle speed in a low-speed section and notify the driver of a combination of vibration and sound close to traveling sound and proportional to the vehicle speed in a high-speed section.

Still another embodiment of the present disclosure provides an electric vehicle state control method, which controls a state of an electric vehicle to safely operate the electric vehicle, the electric vehicle state control method including: entering a traveling state when a traveling signal is checked in a startup stop state; entering a startup safety state when the traveling signal is not checked for a first reference time; returning to the startup stop state when a releasing signal is checked in the startup safety state; and entering a key-on state when the releasing signal is not checked in the startup safety state for a second reference time.

In this case, the electric vehicle state control method may further include entering the startup stop state when a startup signal is detected in the key-on state.

In addition, the electric vehicle state control method may further include notifying a driver of the startup stop state when a vehicle state returns to the startup stop state from the startup safety state.

In addition, the electric vehicle state control method may further include: notifying a driver of the traveling state when a vehicle enters the traveling state.

In addition, a capacitor embedded in an inverter of the electric vehicle may be kept charged in the startup stop state and the startup safety state.

In addition, the entering of the key-on state when the releasing signal is not checked in the startup safety state for the second reference time may include: checking whether a short reference time elapses; checking whether a driver position is a predetermined distance or more when the short reference time elapses and changing a vehicle state to the key-on state when the driver position is the predetermined distance or more; and changing the vehicle state to the key-on state when a long reference time elapses even when the driver position is within the predetermined distance.

Advantageous Effect

According to the present disclosure, it is possible to prevent the driver from forgetting the long-term idling situation of the vehicle.

In addition, according to the present disclosure, it is possible to prevent a risk caused when the driver forgets the situation in which the startup key of the vehicle is turned on and the vehicle is stationary for a long period of time.

In addition, according to the present disclosure, it is possible to allow the driver to intuitively recognize the traveling state of the vehicle even while the electric vehicle travels.

In addition, according to the present disclosure, it is possible to notify the driver that the electric motor vehicle is in the startup state. Further, it is possible to determine the driver's driving will in the startup state of the vehicle and forcibly change the vehicle state to the key-on state, in which the throttle is inactivated, when it is determined that the driver has no driving will. Therefore, it is possible to prevent an inadvertent throttle operation and other safety accidents.

In addition, particularly, according to the present disclosure, it is possible to prevent a safety accident of an electric personal mobility that often causes erroneous operations because the throttle is exposed.

DESCRIPTION OF DRAWINGS

FIG. 1 is a conceptual view illustrating three types of states of an electric vehicle and state change conditions that are criteria of operations when performing an electric vehicle state notification method according to the spirit of the present disclosure.

FIG. 2A is a conceptual view illustrating the state change conditions and four types of states of the electric vehicle made by adding a startup safety state to the three types of states in FIG. 1 in order to improve driving safety when performing the electric vehicle state notification method according to the spirit of the present disclosure.

FIG. 2B is a graph illustrating a process in which the vehicle enters a startup stop state, the startup safety state, and a key-on state after the vehicle is stationary after traveling.

FIG. 3 is a view illustrating one embodiment of a control device of the electric vehicle disclosed in the present disclosure.

FIG. 4 is a graph illustrating a form of vibration and sound information combined as a solution for traveling state notification according to the spirit of the present disclosure.

FIG. 5 is a flowchart illustrating a first embodiment of the electric vehicle state notification method disclosed in the present disclosure.

FIG. 6 is a flowchart illustrating a second embodiment of the electric vehicle state notification method disclosed in the present disclosure.

FIG. 7 is a view illustrating another embodiment of the control device of the electric vehicle disclosed in the present disclosure.

FIG. 8 is a flowchart illustrating the electric vehicle state control method that may be performed by the control device of the electric vehicle illustrated in FIG. 7 according to the embodiment of the present disclosure, focusing on the startup safety state.

FIG. 9 is a flowchart illustrating the electric vehicle state control method that may be performed by the control device of the electric vehicle illustrated in FIG. 7 according to the embodiment of the present disclosure while expressing the states including the key-on state and a traveling state.

BEST MODE

In the description of the present disclosure, the terms such as "first" and "second" may be used to describe various constituent elements, but the constituent elements may not be limited by the terms. These terms are used only to distinguish one constituent element from another constituent element. For example, a first component may be named a second component, and similarly, the second component may also be named the first component, without departing from the scope of the present disclosure.

When one constituent element is described as being "coupled" or "connected" to another constituent element, it should be understood that one constituent element can be coupled or connected directly to another constituent element, and an intervening constituent element can also be present between the constituent elements.

The terms used in the present specification are used only for the purpose of describing particular embodiments and are not intended to limit the present disclosure. Singular expressions may include plural expressions unless clearly described as different meanings in the context.

In the present specification, the terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof.

In addition, shapes and sizes of elements illustrated in the drawings may be exaggerated for a more apparent description.

FIG. 1 is a conceptual view illustrating three types of states of an electric vehicle and state change conditions that are criteria of operations when performing an electric vehicle state notification method according to the spirit of the present disclosure.

The key-on state is a state in which there is no parameter related to traveling except that a startup key is mounted in an electric vehicle and positioned in a turn-on state. That is, motor rpm is 0, a vehicle speed is also 0, and a throttle opening degree is also 0, but the startup key is positioned at the turn-on position. In addition, a throttle handle is inactivated for safety. According to the implementation, a power supply to a motor and an inverter may also be cut off.

The traveling state is a state in which the electric vehicle is traveling and the vehicle speed and the motor rpm have predetermined values.

The startup state is a state corresponding to a state in which an internal combustion engine vehicle is turned on, and an engine operates, but the vehicle is stationary. The startup state is a state in which predetermined power is supplied to the motor or the inverter. According to the implementation, in the startup state, a capacitor embedded in the inverter may be kept charged continuously. In contrast, in the key-on state, the capacitor may be discharged over time.

When a driver gets in the parked electric vehicle, mounts the startup key of the vehicle, and then rotates the startup key to the turn-on state, the initial key-on state is implemented. In the initial key-on state, various types of controllers (e.g., a traveling controller, an ECU, a TCU, and the like) of the vehicle are woken up, and a state notification device configured to perform a state notification method according to the spirit of the present disclosure is also woken up.

In the key-on state, when an operation of the driver for starting up the electric vehicle is inputted, the startup state is implemented as illustrated. The startup state may be an idling state in comparison with the internal combustion engine vehicle. The operation of the driver for starting up the vehicle may be an operation of turning on a startup switch. As other examples, the operation of starting up the vehicle may include all or one or more of an operation of inputting a throttle opening degree having a value of 0 or more, an operation of releasing a vehicle brake, an operation of engaging a clutch, an operation of the driver seating himself/herself (checked by a seating state detection sensor), an operation of manipulating the startup key (a separate traveling position is present in addition to the turn-on position), and an operation of a parking device (e.g., a parking brake, a parking support, or the like).

The vehicle state is changed to the startup state when the vehicle enters the traveling state by a general traveling operation of the driver in the startup state, i.e., the idling state and a speed of the vehicle becomes 0 in the traveling state, in other words, even though the traveling vehicle is temporarily stopped and traveling-related parameters decrease to 0.

When the operation of the driver for general traveling is inputted in the startup state, the corresponding electric vehicle may enter the traveling state and travel. For example, the operation for general traveling may be performed so that the throttle opening degree becomes a predetermined reference value or more. In this case, it is advantageous to set the predetermined reference value to a value clearly larger than a determination reference value of 0 or more required to change the vehicle state from the key-on state to the startup state.

To ensure safety, in the startup state, the vehicle state may be changed to the key-on state without a change in traveling-related parameter when a predetermined reference time elapses. In addition, the vehicle state may be changed to the key-on state even when an error occurs when the vehicle enters the startup state or even when it is determined that the driver has no driving will. It is advantageous in terms of convenience for the driver to set the reference time to a sufficiently long time for which the driver who stops the operation of the electric vehicle may forget the state in which the vehicle is started up.

FIG. 2A is a conceptual view illustrating the state change conditions and four types of states of the electric vehicle made by adding a startup safety state to the three types of states in FIG. 1 in order to improve driving safety when performing the electric vehicle state notification method according to the spirit of the present disclosure.

FIG. 2B is a graph illustrating a process in which the vehicle enters a startup stop state, the startup safety state, and a key-on state after the vehicle is stationary after traveling.

The illustrated four types of states of the electric vehicle are the traveling state, the startup stop state, the startup safety state, and the key-on (stopped) state.

The key-on state is a state in which there is no parameter related to traveling except that the startup key is mounted in the electric vehicle and positioned in the turn-on state. That is, the motor rpm is 0, the vehicle speed is also 0, and the throttle opening degree is also 0, but the startup key is positioned at the turn-on position. In addition, the throttle handle is inactivated for safety. According to the implementation, the power supply to the motor and the inverter may also be cut off.

The traveling state is a state in which the electric vehicle is traveling and the vehicle speed and the motor rpm have predetermined values.

The startup stop state is a state corresponding to a state in which an internal combustion engine vehicle is turned on, and an engine operates, but the vehicle is stationary. The startup stop state is a state in which predetermined power is supplied to the motor or the inverter. According to the implementation, in the startup stop state, the capacitor embedded in the inverter may be kept charged continuously. In contrast, in the key-on state, the capacitor may be discharged over time.

The startup safety state is a state newly proposed according to the spirit of the present disclosure and identical to the startup stop state in terms of the other parameters or the power supply state. However, when the time elapses so that the likelihood that the driver forgets the startup stop state, i.e., the idling state increases, the vehicle enters the startup safety state according to the spirit of the present disclosure. Unlike the key-on state, the throttle handle is not inactivated. However, the throttle handle is in the state in which the throttle handle may be activated by a predetermined particular signal.

When a driver gets in the parked electric vehicle, mounts the startup key of the vehicle, and then rotates the startup key to the turn-on state, the initial key-on state is implemented. In the initial key-on state, various types of controllers (e.g., the traveling controller, the ECU, the TCU, and the like) of the vehicle are woken up, and a state control device configured to perform a state notification method according to the spirit of the present disclosure is also woken up.

In the key-on state, when an operation of the driver for starting up the electric vehicle is inputted, the startup stop state is implemented as illustrated. The startup stop state may be the idling state. The operation of the driver for starting up the vehicle may be the operation of turning on the startup switch. As other examples, the operation of starting up the vehicle may include all or one or more of the operation of inputting the throttle opening degree having a value of 0 or more, the operation of releasing the vehicle brake, the operation of engaging the clutch, the operation of the driver seating himself/herself (checked by the seating state detection sensor), the operation of manipulating the startup key (the separate traveling position is present in addition to the turn-on position), and the operation of the parking device (e.g., the parking brake, the parking support, or the like).

Whether the electric vehicle is in the idling state is checked immediately after the speed of the vehicle and the motor rpm become 0. The startup stop state may be more finely divided into an idling inspection state before whether the electric vehicle is in the idling state is checked, and an idling state after it is determined that the electric vehicle is in the idling state.

When the operation of the driver for general traveling is inputted in the startup stop state, the corresponding electric vehicle may enter the traveling state and travel. For example, the operation for general traveling may be performed so that the throttle opening degree becomes a predetermined reference value or more. In this case, it is advantageous to set the predetermined reference value to a value clearly larger than a determination reference value of 0 or more required to change the vehicle state from the key-on state to the startup stop state.

The vehicle enters the startup safety state when a predetermined first reference time elapses in the startup stop state without a change in traveling-related parameter made by the driver's operation. It is advantageous to set the first reference time to a time for which the driver who stops the operation of the electric vehicle may forget the state in which the vehicle is started up.

In the startup safety state, the driver needs to perform a particular operation to return the vehicle state to the startup stop state. The particular operation is to prevent the electric vehicle from being quickly operated in a state in which the driver does not prepare for the quick operation of the electric vehicle. It is advantageous to implement the particular operation so that the driver easily and intuitively recognizes the particular operation and easily infers the particular operation as the continuous operation even though the driver forgets the vehicle state. For example, the particular operation may be an operation of repeatedly operating the throttle handle twice or an operation of operating the startup switch or the startup key again.

In the startup stop state, the vehicle state may be changed to the key-on state when an error occurs after the vehicle enters the startup stop state or when it is determined that the driver has no driving will.

According to the implementation, when the driver performs a general traveling operation without performing the particular operation, the control may be performed according to the purpose of the present disclosure so that the vehicle state is not changed to the traveling state but changed to the key-on state and then changed from the key-on state to the traveling state via the startup stop state.

The configuration in which the vehicle state is changed to the startup stop state when the vehicle enters the traveling state by the general traveling operation of the driver in the startup stop state, i.e., the idling state and the speed of the vehicle becomes 0 in the traveling state is similar to the configuration of the general electric vehicle.

The embodiment of the present disclosure to be described below proposes modes related to the parking/stopping and proposes a method of notifying the driver so that the drive may know the mode state among the key-on state, the startup stop state, the startup safety state, and the traveling state (in the case of FIG. 1, the key-on state, the startup state, and the traveling state).

Because the vehicle is stationary in all the key-on state, the startup stop state, and the startup safety state (or startup state), it is difficult for the driver to recognize which state the driver's vehicle is in.

In the key-on state among the states (modes) when the vehicle is stationary, only a startup operation, i.e., an operation of the driver changing the position of the startup key to the position for traveling is performed as a method of changing the vehicle state to another state, and most functions for vehicle traveling are inactivated, such that the risk caused by non-recognition of the driver is not great even though the driver does not recognize the key-on state.

Meanwhile, a driving risk is prevented when the startup stop state is changed to the startup safety state and the startup safety state may be released only by the particular operation like the configuration implemented by the control method of the electric vehicle according to the embodiment of the present disclosure to be described below. However, in a situation in which the driver cannot recognize the situation in which the vehicle state is currently changed to the startup safety state, the driver may erroneously recognize a phenomenon, in which the vehicle does not appropriately respond to the traveling operation, as a breakdown of the vehicle even though the driver continuously performs the typical traveling operation. For this reason, traveling comfort deteriorates.

Therefore, to prevent the misrecognition of the driver, it is necessary to notify the driver of the currently changed state of the vehicle.

According to the electric vehicle state notification method that is one of the embodiments of the present disclosure, a main purpose of notifying the driver of the vehicle state according to the spirit of the present disclosure is to notify the driver of the startup state when the vehicle state is one of the three types of modes illustrated in FIG. 1.

According to the electric vehicle state notification method that is one of the embodiments of the present disclosure, a main purpose for notifying the driver of the vehicle state according to the spirit of the present disclosure is to notify the driver of the startup stop state and the startup safety state when the vehicle state is one of the four types of modes illustrated in FIG. 2A.

FIG. 3 illustrates one embodiment of the control device of the electric vehicle disclosed in the present disclosure. It is possible to notify the driver of the electric vehicle state based on the three types of modes in FIG. 1 or the four types of modes in FIG. 2A by using the device according to the embodiment illustrated in FIG. 3.

The illustrated electric vehicle state notification device includes: a driving parameter confirmation unit 210 configured to collect measured values of parameters related to traveling of the electric vehicle; a driving state determination/transition unit 220 configured to determine the driving state (one of the key-on state, the startup state, and the traveling state) of the electric vehicle based on the collected measured values of the parameters related to the traveling; and a driver notification unit S280 configured to intuitively notify the driver of the determined driving state of the electric vehicle.

According to the implementation, the driving state determination/transition unit 220 divides the startup state of the electric vehicle into the startup stop state and the startup safety state and determines the startup stop state and the startup safety state, and the device may further include a conditional transition unit 240 configured to change the vehicle state to the startup safety state when a time for which the vehicle is stationary in the startup stop state exceeds a predetermined reference time and change the vehicle state from the startup safety state to the startup stop state in accordance with the particular operation of the driver.

According to the implementation, the driving state determination/transition unit may further include a driving will determination unit 260 configured to determine the driver's driving will while the vehicle is stationary. In this case, when it is determined that the driver has the driving will when the electric vehicle is in the startup safety state (the startup state in the case of FIG. 1), the driver notification unit 280 may intuitively notify the driver that the electric vehicle is currently in the startup safety state (the startup state in the case of FIG. 1).

For example, the notification of the startup safety state may be made by operating a separate vibration device by supplying low power to the vibration device, generating a sound signal through a sound speaker, generating a continuous or flickering visual signal through a visual indicator, or simultaneously generating visual/auditory signals through a smart device.

For example, when the contact of the driver is detected by a contact detection sensor installed on a driver seat, a foot cradle, the throttle handle, or the like in the startup safety state, it is determined that the driver may immediately accelerate the vehicle at any time in the stationary situation, and a predetermined signal (vibration) may be transmitted to the driver by using auditory and tactile means.

For example, a vibration means may be provided on an upper surface of the driver seat or an inner surface of a helmet and transmit effective notification to a driver of a two-wheel electric vehicle by using vibration. In the case of the vibration means provided in the helmet, the vibration means may be installed on a portion that adjoins the driver's body when the driver wears the helmet. It is advantageous to install the vibration means on a portion that adjoins another body portion such as the driver's chin instead of the driver's head when taking into consideration that the vibration applied directly to the driver's head may cause discomfort to the driver. In this case, the driver notification unit 280 may include a vibration element installed on the portion that adjoins the driver's chin among the portions on the inner surface of the helmet worn by the driver.

The driving state determination/transition unit 220, the driving will determination unit 260, the conditional transition unit 240, and the driver notification unit 280 may be SW modules in a controller 200 that is a kind of CPU. The controller 200 may be implemented such that another MCU of the vehicle also serves to perform the above-mentioned functions. Alternatively, the controller 200 may be implemented as a separate CPU or MCU.

The driving parameter confirmation unit 210 may collect measured values and recorded values related to a vehicle speed, rpm, a throttle, a power converter, electrical properties of a traction motor, a power storage device, a user certification state, and the like.

The driving parameter confirmation unit 210 collects sensing signals from a throttle sensor 120 and the other sensors 150 of the vehicle and transmits converted values of the digital numerical values related to the collected signals or the respective signals to the driving state determination/transition unit 220 and/or the driving will determination unit 260.

The driving state determination/transition unit 220 may use the received signals/values as reference information for determining the state related to the driving of the vehicle. For example, in the traveling state, the vehicle state may be changed to the startup stop state and the startup stop state may be determined when the vehicle speed and rpm are 0, various types of motion sensors sense that there is no motion, and the key is in the turn-on state.

The driving state determination/transition unit 220 may determine the startup state (or the startup stop state) when all 1) the key-on state in which no system error is present, 2) the state in which the throttle opening degree value is 0%, 3) the state in which the motor rpm is 0 and the vehicle is stationary, and 4) the state in which the driver pushes the startup switch (button) (startup signal ON) are satisfied.

The driving state determination/transition unit 220 determines the driver's driving will based on the information received from the driving parameter confirmation unit 210. For example, the driving state determination/transition unit 220 may determine the driver's driving will based on a time critical value and a motion sensor value after the vehicle enters the startup state (or the startup safety state).

The driving state determination/transition unit 220 may check whether the driver has the driving will by analyzing signals obtained by the other sensors 150. For example, it may be determined that the vehicle cannot be driven because of the absence of the driver when an occupant detection sensor obtains a signal indicating the absence of the driver for a predetermined time.

For example, the driving state determination/transition unit 220 may determine the driver's driving will, add up the times after the vehicle enters the startup state (or the startup safety state), and compare the time with predetermined two short/long timeout thresholds. When the time exceeds the long timeout threshold, the driving state determination/transition unit 220 determines that the driver has no driving will. When the time exceeds the short timeout threshold, the driving state determination/transition unit 220 may determine, based on the motion sensor value, that the driver does not exist in the vehicle. Alternatively, when a distance between the vehicle and the driver exceeds a preset distance threshold, the driving state determination/transition unit 220 may determine that there is no driving will.

For example, the driving state determination/transition unit 220 may change the vehicle state to the key-on state when an error occurs after the vehicle enters the startup state (the startup stop state or the startup safety state) or when it is determined that the driver has no driving will based on the parameters related to the driving.

The throttle sensor 120 does not detect an opening degree of an actual throttle, unlike the internal combustion engine vehicle, but the throttle sensor 120 detects a degree of a motion of a handle for adjusting a throttle opening degree (e.g., manipulating an accelerator pedal/handle) of the internal combustion engine vehicle by the driver, and the detection signal is treated as a signal related to the throttle opening degree.

A rpm sensor, an acceleration sensor, a GPS sensor, a motion sensor, a gyro sensor, a switch position determination sensor, an occupant detection sensor, and the like may be applied as the other sensors 150.

FIG. 3 illustrates constituent elements for the traveling of the electric vehicle, the constituent elements including: a drive motor 580 configured to generate power for the traveling of the vehicle; a power storage device 520 configured to store power for the traveling of the vehicle; a power converter 540 configured to convert the power stored in the power storage device into the power for operating the vehicle; and an inverter 560 configured to rotate the drive motor 580 by using the converted power.

The illustrated controller 200 performs torque control on the inverter 560. Because the controller 200 is a basic component of the general electric vehicle, a detailed description thereof will be omitted.

The inverter 560 includes switching elements and the capacitor for accumulating output power. According to the spirit of the present disclosure, the power accumulated in the capacitor is discharged in the key-on state. In contrast, the inverter is controlled so that a state in which the power is accumulated in the capacitor is maintained in the startup stop state and the startup safety state (the startup state in FIG. 1).

The drawings illustrate accessory constituent elements for supporting the driver notification unit 280, and the constituent elements include: a sound speaker 420 configured to output a sound signal; a vibration device 440 configured to output a vibration signal; and a display indicator 460 configured to output visual signal/information.

As solutions for allowing the driver notification unit 280 to notify the driver that the electric vehicle is in the startup state (or the startup safety state), the combinations of the following four solutions may be used depending on whether the devices are connected, for example.

First, it is possible to aurally notify the driver by generating a sound signal through the sound speaker. Second, it is possible to tactilely notify the driver by supplying power to the vibration device. Third, it is possible to notify the driver by generating a continuous or flickering visual signal through the display indicator device. Fourth, it is possible to notify the driver by simultaneously generating visual/auditory signals through the smart device. That is, the driver notification unit 280 may serve to transmit a signal for controlling a means capable of providing the notification to the driver.

However, the intuitive notification means auditory and tactile alarms (particularly, tactile alarms), except for visual notification that is a general alarm means. Particularly, the auditory and tactile alarms may be applied together. In addition, in a case in which a rotary or lever-type throttle, which may adjust a load required for the driver to manipulate the throttle, is provided, a load value for operating the throttle may be applied as the intuitive notification signal. The load value may be recognized as a kind of tactile value when the driver manipulates the throttle handle.

FIG. 4 is a graph illustrating a form of vibration and sound information combined as a solution for traveling state notification according to the spirit of the present disclosure.

When the electric vehicle is in the traveling state, the driver notification unit 280 may notify the driver that the electric vehicle is in the traveling state by means of sound information in accordance with the vehicle speed. For example, as illustrated in the graph in FIG. 4, sound with higher sound volume and/or higher frequency may be transmitted as the vehicle speed increases.

This is to provide a traveling state monitoring function of generating an auditory/tactile signal, like the internal combustion engine, for safety of a peripheral person during driving because the noise of the electric motor vehicle is small even when the electric motor vehicle travels.

In the present disclosure, the two types of auditory means (sound speaker) and tactile means (vibration device) are combined, and the traveling state is divided into three sections in accordance with the vehicle speed, such that two types of auditory/tactile signals are generated based on the strategies for the respective sections to not only notify the driver but also notify the peripheral person that the vehicle passes.

The first type of sound/vibration indicates sound closer to information sound than actual traveling sound, and the second type of sound/vibration indicates sound similar to the actual traveling sound.

For example, the first type of sound/vibration has a comparatively high frequency having pulses with coarse intervals. In contrast, the second type of sound/vibration may have a frequency of the engine sound of the internal combustion engine, and the frequency of the sound has pulses with dense intervals, similarly to the engine sound of the internal combustion engine.

The examples will be made for respective vehicle speed sections.

First, in a low-speed section (1 to 30 km/h), the idle state is immediately released, and thus there is almost no noise of the electric motor in this section. Therefore, a gradient of −2 in a reverse direction is made with respect to the speed, and the first sound/vibration is generated. For example, the loudest sound/vibration may be generated at 1 km/h, the gradient of −2 may be made, and the first sound/vibration may decrease.

Next, in a middle-speed section (30 to 60 km/h), the two types of sound/vibration, i.e., the first sound/vibration and the second sound/vibration are generated. In this case, the first sound/vibration may have a gradient of −2, decrease, and disappear at a vehicle speed of 50 km/h. The second sound/vibration may have a gradient of 1 from a vehicle speed of 30 km/h and increase.

Lastly, in a high-speed section (60 to 100 km/h), only the second sound/vibration may be generated, and the second sound/vibration may have a gradient of 1.75 from 60 km/h and gradually increase, for example.

The conditional transition unit 240 in FIG. 3 changes from the startup state to the traveling state in accordance with the particular operation in the case of FIG. 1. In the case of FIG. 2, the conditional transition unit 240 changes from the startup safety state to the startup stop state or the traveling state in accordance with the particular operation.

The particular operation checked by the conditional transition unit 240 may be divided into two types. The first type has a series of continuous operations for the throttle handle, and the second type has simultaneous inputs of the operation of the throttle handle and the operation of another part.

In the case of the first type, when the throttle of the electric vehicle is operated continuously twice within a predetermined time, the conditional transition unit 240 may change the vehicle state so that the vehicle is out of the startup safety state (or the startup state). More specifically, when a first throttle sensing value is equal to or larger than a first recognition threshold and a second throttle sensing value is equal to or larger than a min threshold, it is possible to apply a second throttle sensing value to calculate torque to be outputted while considering the second throttle sensing value as a throttle value actually intended by the driver. In this case, when the time between the first throttle operation and the second throttle operation exceeds a throttle valid time, the first and second operations cannot be considered as a continuous throttle operation, and the first throttle operation is required again. This is to prevent a vehicle motion caused by an inadvertently throttle operation by the driver in the startup state. That is, the initial throttle operation is interpreted as the driver's intention to depart from the startup safety state (or the startup state), and the second throttle value of the two throttle operations is determined as an actually intended effective value. The above-mentioned conditions are released after the vehicle speed is generated, and the throttle operation in the general traveling state is interpreted and applied as it is as the throttle operation is inputted.

For example, when the throttle is initially operated (the first operation) in the reverse direction in the startup safety state (or the startup state) and then the throttle is normally operated (the second operation), the conditional transition unit 240 may determine the operations as the effective values and change the vehicle state so that the vehicle state is out of the startup safety state (or the startup state).

In the case of the second type, when the startup switch operation (i.e., the operation required to change the vehicle state from the key-on state to the startup stop state (or the startup state)) is applied and then the throttle operation is generated in the startup safety state (or the startup state), the conditional transition unit may change the vehicle state so that the vehicle state is out of the startup safety state (or the startup state) (e.g., change the vehicle state from the startup safety state to the startup stop state).

For example, the conditional transition unit may determine the throttle operation, in a state in which the brake is engaged at the time of starting the vehicle in the startup safety state (or the startup state), as an effective value and change the vehicle state so that the vehicle state is out of the startup safety state (or the startup state).

Alternatively, a separate operation switch may be provided to change the states. In this case, when the throttle is operated together with the operation of the separate operation switch (i.e., the throttle switch), the conditional transition unit 240 may change the vehicle state so that the vehicle state is out of the startup safety state (or the startup state). In this case, for example, a push-type switch separately provided at a lateral side of the throttle may be applied as the separate operation switch. When the switch is pushed and then the throttle is pulled in the startup safety state (or the startup state), it is possible to determine this situation as an effective value.

FIG. 5 is a flowchart illustrating a first embodiment of the electric vehicle state notification method disclosed in the present disclosure. The first embodiment may be performed when the control device in FIG. 3 changes the state of the electric vehicle based on FIG. 1.

The method includes: collecting the measured values of the parameters related to the traveling of the electric vehicle (S110); determining the driving state of the electric vehicle based on the collected measured values of the parameters related to the traveling (S120); and intuitively notifying the driver of the determined driving state of the electric vehicle (S160). The driving state is divided into the key-on state in which the throttle is inactivated, the startup state in which the throttle is activated, and the traveling state.

As illustrated, when the driving state determined in step S120 is not the startup state (S140), and likewise, the driving state is not the traveling state (S150), the process returns to step S110 again because a separate notification is not provided to the driver in the key-on state.

When the driving state is the traveling state in illustrated step S150, the driver is notified of the traveling state in accordance with the speed (S170), and the notification of the traveling state may advantageously be intuitive notification using tactile/auditory information. According to the implementation, the notification of the traveling state in step S170 may use the two types of auditory/tactile signals described with reference to the graph in FIG. 5.

When it is determined that the driver has the driving will when the electric vehicle is in the startup state, the intuitive notification step S160 may notify the driver of the startup state through vibration and sound information.

For example, the traveling state notification step S160 may notify the driver of a combination of vibration and sound closer to information sound and inversely proportional to the vehicle speed in the low-speed section and notify the driver of a combination of vibration and sound closer to traveling sound and proportional to the vehicle speed in the high-speed section.

The intuitive notification step S160 may vibrate the vibration element installed on the portion that adjoins the driver's chin among the portions of the inner surface of the helmet worn by the driver as the solution for notifying the driver of the traveling state by means of vibration. Likewise, the notifying of the driver of the traveling state in accordance with the speed (S170) may also use the vibration element installed on the portion that adjoins the driver's chin to transmit vibration to the driver.

FIG. 6 is a flowchart illustrating a second embodiment of the electric vehicle state notification method disclosed in the present disclosure. The second embodiment may be performed when the control device in FIG. 3 changes the state of the electric vehicle based on FIG. 2A.

The illustrated electric vehicle state notification method includes: collecting the measured values of the parameters related to the traveling of the electric vehicle (S210); determining the driving state of the electric vehicle based on the collected measured values of the parameters related to the traveling (S220); and intuitively notifying the driver of the determined driving state of the electric vehicle (S260). The driving state is divided into the key-on state in which the throttle is inactivated, the startup stop state in which the throttle is activated so as to be operated in the same way in the traveling state, the startup safety state in which the throttle is activated so as to be operated by the particular operation, and the traveling state.

Like the case illustrated in FIG. 5, the process may return to step S210 again because a separate notification is not provided to the driver in the key-on state.

Like the case illustrated in FIG. 5, when the driving state is the traveling state in illustrated step S250, the driver is notified of the traveling state in accordance with the speed (S270), and the notification of the traveling state may advantageously be intuitive notification using tactile/auditory information.

When it is determined that the driver has the driving will when the electric vehicle is in the startup safety state, the intuitive notification step S260 may notify the driver of the startup safety state through vibration and sound information.

The intuitive notification step S260 may vibrate the vibration element installed on the portion that adjoins the driver's chin among the portions of the inner surface of the helmet worn by the driver as the solution for notifying the driver of the traveling safety state by means of vibration. Likewise, the notifying of the driver of the traveling state in accordance with the speed (S270) may also use the vibration element installed on the portion that adjoins the driver's chin to transmit vibration to the driver.

FIG. 7 illustrates another embodiment of the control device of the electric vehicle disclosed in the present disclosure. It is possible to control the state of the electric vehicle based on the four modes in FIG. 2A by using the device according to the embodiment illustrated in FIG. 7. More specifically, an object of the device illustrated in FIG. 7 is to perform control to change the state of the electric vehicle that includes the startup safety mode, thereby improving safety while the vehicle travels.

The state control device illustrated in FIG. 7 includes: a startup state determination unit 320 configured to determine the startup stop state in the key-on state and determine whether to enter the startup safety state from the startup stop state; a driving will determination unit 360 configured to determine the driver's driving will in the startup stop state or the startup safety state; a safety mode execution unit 340 configured, in the startup safety state, to determine whether to maintain the startup safety state, determine whether to enter the key-on state, determine whether to return to the startup stop state, and execute a determination result; a traveling state execution unit 380 configured to check a throttle signal for traveling and monitor the traveling state; and driver notification units 420, 440, and 460 configured to notify the driver of the startup stop state and the traveling state.

The startup state determination unit 320, the driving will determination unit 360, the safety mode execution unit 340, and the traveling state execution unit 380 may be SW modules in a controller 300 that is a kind of CPU. The controller 300 may be implemented such that another MCU of the vehicle also serves to perform the above-mentioned functions. Alternatively, the controller 300 may be implemented as a separate CPU or MCU.

The safety mode execution unit 340 may perform a kind of startup state safety monitoring function of notifying the driver of the startup safety state, and perform an additional operation of changing the vehicle state to the key-on state when the driver has no driving will. For example, the notification of the startup safety state may be made by operating a separate vibration device by supplying low power to the vibration device, generating a sound signal through a sound speaker, generating a continuous or flickering visual signal through a visual indicator, or simultaneously generating visual/auditory signals through a smart device.

The traveling state execution unit 380 may perform a kind of traveling state monitoring function of generating a tactile/sound signal in proportion to the vehicle speed even while the vehicle travels.

The startup state determination unit 320 may determine the startup stop state by using a vehicle speed, rpm, a throttle, a power converter, electrical properties of a traction motor, a power storage device, a user certification state, and the like.

The startup state determination unit 320 may receive sensing signals from the throttle sensor 120 and the other sensors 150 of the vehicle and use the sensing signals as reference information for determining the startup stop state. For example, in the traveling state, the vehicle state may enter the startup stop state and the startup stop state may be determined when the vehicle speed and rpm are 0, various types of motion sensors sense that there is no motion, and the key is in the turn-on state.

The startup state determination unit 320 may determine the startup stop state when all 1) the key-on state in which no system error is present, 2) the state in which the throttle opening degree value is 0%, 3) the state in which the motor rpm is 0 and the vehicle is stationary, and 4) the state in which the driver pushes the startup switch (button) (startup signal ON) are satisfied.

The driving will determination unit 360 may determine the driver's driving will based on the time critical value and the motion sensor value after the vehicle enters the startup safety state.

The driving will determination unit 360 may check whether the driver has the driving will by analyzing the signals obtained by the other sensors 150. For example, it may be determined that the vehicle cannot be driven because of the absence of the driver when the occupant detection sensor obtains a signal indicating the absence of the driver for a predetermined time.

The driving will determination unit 360 may determine the driver's driving will, 1) add up the times after the vehicle enters the startup stop state, and compare the time with predetermined two short/long timeout thresholds. 1-1) When the time exceeds the long timeout threshold, the driving state determination/transition unit 220 determines that the driver has no driving will. 1-2) When the time exceeds the short timeout threshold, the driving state determination/transition unit 220 may determine, based on the motion sensor value, that the driver does not exist in the vehicle. Alternatively, when a distance between the vehicle and the driver exceeds a preset distance threshold, the driving state determination/transition unit 220 may determine that there is no driving will. In this case, the short timeout threshold may be equal to the first reference time.

The throttle sensor 120 does not detect an opening degree of an actual throttle, unlike the internal combustion engine vehicle, but the throttle sensor 120 detects a degree of a motion of a handle for adjusting a throttle opening degree (e.g., manipulating an accelerator pedal/handle) of the internal combustion engine vehicle by the driver, and the detection signal is treated as a signal related to the throttle opening degree.

A rpm sensor, an acceleration sensor, a GPS sensor, a motion sensor, a gyro sensor, a switch position determination sensor, an occupant detection sensor, and the like may be applied as the other sensors 150.

In addition, FIG. 7 illustrates constituent elements for the traveling of the electric vehicle, the constituent elements including: a drive motor 580 configured to generate power for the traveling of the vehicle; a power storage device 520 configured to store power for the traveling of the vehicle; a power converter 540 configured to convert the power stored in the power storage device into the power for operating the vehicle; and an inverter 560 configured to rotate the drive motor 580 by using the converted power.

The illustrated controller 300 performs torque control on the inverter 560. Because the controller 300 is a basic component of the general electric vehicle, a detailed description thereof will be omitted.

The inverter 560 includes switching elements and the capacitor for accumulating output power. According to the spirit of the present disclosure, the power accumulated in the capacitor is discharged in the key-on state. In contrast, the inverter is controlled so that a state in which the power is accumulated in the capacitor is maintained in the startup stop state and the startup safety state.

In addition, FIG. 7 illustrates an embodiment in which the driver notification units 420, 440, and 460 include a sound speaker 420 configured to output a sound signal; a vibration device 440 configured to output a vibration signal; and a display indicator 460 configured to output visual signal/information.

For example, as solutions for notifying the driver of the startup stop state, the combinations of the following four solutions may be used depending on whether the devices are connected.

First, it is possible to aurally notify the driver by generating a sound signal through the sound speaker 420. Second, it is possible to tactilely notify the driver by supplying power to the vibration device 440. Third, it is possible to notify the driver by generating a continuous or flickering visual signal through the display indicator 460. Fourth, it is possible to notify the driver by simultaneously generating visual; auditory signals through the smart device carried by the driver.

FIG. 8 is a flowchart illustrating the electric vehicle state control method that may be performed by the control device of the electric vehicle illustrated in FIG. 7 according to the embodiment of the present disclosure, focusing on the startup safety state.

The state control method in the startup stop state of the illustrated electric vehicle includes: entering the traveling state when a traveling signal is checked in the startup stop state (S420); entering the startup safety state when the traveling signal is not checked for a first reference time (S440); returning to the startup stop state when a releasing signal is checked in the startup safety state (S460); and entering the key-on state when the releasing signal is not checked in the startup safety state for a second reference time (S480).

The traveling signal is a signal made by a general traveling operation of the driver. As described above, for example, the traveling signal may be a signal made so that the throttle opening degree becomes a predetermined reference value or more.

The releasing signal is to prevent the electric vehicle from being quickly operated in a state in which the driver does not prepare for the quick operation of the electric vehicle. It is advantageous to implement the releasing signal so that the driver easily and intuitively recognizes the releasing signal generated by the continuous operation even though the driver forgets the vehicle state. For example, the releasing signal may be generated by the particular operation, that is, the operation of repeatedly operating the throttle handle twice or the operation of operating the startup key again.

FIG. 9 is a flowchart illustrating the electric vehicle state control method that may be performed by the control device of the electric vehicle illustrated in FIG. 7 according to the embodiment of the present disclosure while expressing the states including the key-on state and a traveling state.

In the illustrated flowchart, the entering of the traveling state in FIG. 8 (S420) is specified as entering the traveling state when a throttle voltage is a predetermined reference voltage or higher (S410).

As illustrated, the method may further include: before the entering of the startup stop state (S400), entering the key-on state (S300); checking sensor conditions in the key-on state (S322); and entering the startup stop state when a startup signal is detected (S328).

The method may further include notifying the driver of the startup stop state after the returning to the startup stop state (S400), that is, when the vehicle state returns to the startup stop state from the startup safety state. For example, as illustrated, the method may include: determining whether to notify the driver of the startup stop state (S550); and performing a sound speaker output, a vibration device output, a display indicator output, and an output to a smart device carried by the driver as a notification (S560). In this case, the smart device carried by the driver may be a navigation device installed in the electric vehicle, a smartphone owned by the driver, and the like.

The notifying of the driver of the startup stop state may confirm the idle state from a sensor and state that may determine the idle state. The notifying of the driver of the startup stop state may notify the driver of the idle state by generating vibration by using a force that is lower than a force required to operate a traction motor but is sufficient to generate the vibration.

The method may further include notifying the driver of the traveling state when the vehicle enters the traveling state from the startup stop state (S600). For example, as illustrated, the method may include: determining whether to provide notification with traveling sound having a magnitude determined depending on the vehicle speed (S630); and outputting the traveling sound through a vehicle sound speaker (S640). In this case, the vehicle sound speaker may output the traveling sound by using a PWM method.

According to the implementation, the notifying of the traveling state may perform a kind of traveling state monitoring and generate an auditory signal, like the internal combustion engine, for ensuring safety of a peripheral person during driving because noise of the electric motor vehicle is small. For example, it is possible to generate the auditory signal in proportion to the vehicle speed through the sound speaker, thereby notifying the peripheral person that the vehicle passes.

Meanwhile, the entering of the key-on state when the releasing signal is not checked in the startup safety state for the second reference time illustrated in FIG. 8 (S480) is segmentalized into checking whether the short reference time elapses in FIG. 9 (S480); checking whether the driver position is a predetermined distance or more when the short reference time elapses and changing the vehicle state to the key-on state when the driver position is the predetermined distance or more (S490); and changing the vehicle state to the key-on state when a long reference time elapses even when the driver position is within the predetermined distance (S495).

That is, the times are added up after the vehicle enters the startup stop state, and the time is compared with the predetermined two long/short reference times (short/long timeout thresholds). When the time exceeds the long reference time (long timeout threshold), it is determined that the drive has no driving will. When the time exceeds the short reference time (short timeout threshold), it is determined that the driver does not exist in the vehicle based on the motion sensor value. Alternatively, when the distance between the vehicle and the driver exceeds a preset reference distance (distance threshold), it is determined that the driver has no driving will.

That is, the second reference time in FIG. 8 may be applied by being segmentalized into the long reference time (long timeout threshold) and the short reference time (short timeout threshold). The first reference time, which is a reference point based on which the vehicle enters the startup safety state, may be equal to the short reference time.

Those skilled in the art will understand that the present disclosure may be carried out in any other specific form without changing the technical spirit or the essential features thereof and the above-described embodiments are illustrative in all aspects and do not limit the present disclosure. The scope of the present disclosure is represented by the claims to be described below rather than the detailed description, and it should be interpreted that the meaning and scope of the claims and all the changes or modified forms derived from the equivalent concepts thereto fall within the scope of the present disclosure.

The invention claimed is:

1. An electric vehicle state control device, which has states for operation safety related to parking/stopping, the states including a key-on state in which a throttle is inactivated, a startup state in which the throttle is activated, and a traveling state, the electric vehicle state control device comprising:
   a driving parameter confirmation unit configured to collect measured values of parameters related to traveling of the electric vehicle from sensors of the electric vehicle;
   a driving state determination/transition unit configured to determine a driving state of the electric vehicle based on the measured values of the parameters related to the traveling received from the driving parameter confirmation unit; and
   a driver notification unit configured to intuitively notify a driver of the determined driving state of the electric vehicle determined in the driving state determination/transition unit,
   wherein the driving parameter confirmation unit, the driving state determination/transition unit, and the driver notification unit are implemented by a central processing unit (CPU) or a motor control unit (MCU),
   wherein the driving state determination/transition unit divides the startup state into a startup stop state in which predetermined power is supplied to a motor of the electric vehicle but the electric vehicle is stationary, and a startup safety state in which the driver is judged to be unaware of an idling state of the electric vehicle, and
   wherein the driver notification unit intuitively notifies the driver that the electric vehicle is in the startup safety state to prevent the electric vehicle from being operated quickly when the driver's intention to drive is determined while in the startup safety state.

2. The electric vehicle state control device of claim 1, wherein the driving state determination/transition unit further comprises:
   a driving will determination unit configured to determine the driver's intention to drive from the sensor information received from the driving parameter confirmation unit.

3. The electric vehicle state control device of claim 1, wherein the driver notification unit comprises a vibration element installed on a portion that adjoins the driver's chin among portions of an inner surface of a helmet worn by the driver.

4. The electric vehicle state control device of claim 1, wherein when the electric vehicle is in the traveling state, the driver notification unit notifies the driver that the electric vehicle is in the traveling state by means of vibration and sound information combined in accordance with a vehicle speed.

5. The electric vehicle state control device of claim 4, wherein the combined vibration and sound information comprises:
   a first combination close to information sound; and
   a second combination close to traveling sound,
   wherein the driver notification unit notifies the driver of the first combination inversely proportional to the vehicle speed in a low-speed section, and wherein the driver notification unit notifies the driver of the second combination proportional to the vehicle speed in a high-speed section.

6. The electric vehicle state control device of claim 1, wherein the driving state determination/transition unit further comprises a conditional transition unit configured to change a vehicle state to the startup safety state when a time for which the vehicle is stationary in the startup stop state exceeds a predetermined short reference time and change the vehicle state from the startup safety state to the startup stop state in accordance with a particular operation of the driver.

7. The electric vehicle state control device of claim 6, wherein the conditional transition unit changes the vehicle state from the startup safety state to the startup stop state when the throttle of the electric vehicle is continuously operated twice within a predetermined time.

8. The electric vehicle state control device of claim 6, wherein the conditional transition unit changes the vehicle state from the startup safety state to the startup stop state when an operation required to change the vehicle state from the key-on state to the startup stop state is applied in the startup safety state.

9. An electric vehicle state notification method of notifying a driver of a state of an electric vehicle to safely operate the electric vehicle, the electric vehicle state notification method comprising:
  collecting measured values of parameters related to traveling of the electric vehicle from sensors of the electric vehicle;
  determining a driving state of the electric vehicle based on the collected measured values of the parameters related to the traveling; and
  intuitively notifying the driver of the determined driving state of the electric vehicle,
  wherein the driving state is divided into a key-on state in which a throttle is inactivated, a startup state in which the throttle is activated, and a traveling state,
  wherein the startup state is divided into a startup stop state in which predetermined power is supplied to a motor of the electric vehicle but the electric vehicle is stationary, and a startup safety state in which the driver is judged to be unaware of an idling state of the electric vehicle, and
  wherein intuitively notifying the driver comprises notifying the driver that the electric vehicle is in the startup safety state to prevent the electric vehicle from being operated quickly when the driver's intention to drive is determined while in the startup safety state through vibration and sound information.

10. The electric vehicle state notification method of claim 9, wherein the startup state is divided into the startup stop state in which the throttle is operated in the same way as the traveling state, and the startup safety state in which the throttle is operated by a particular operation.

11. The electric vehicle state notification method of claim 9, further comprising:
  notifying the driver of the traveling state when the determined driving state is the traveling state.

12. The electric vehicle state notification method of claim 11, wherein the notifying of the traveling state notifies the driver of a combination of vibration and sound close to information sound and inversely proportional to a vehicle speed in a low-speed section and notifies the driver of a combination of vibration and sound close to traveling sound and proportional to the vehicle speed in a high-speed section.

13. An electric vehicle state control method, which controls a state of an electric vehicle to safely operate the electric vehicle, the electric vehicle state control method comprising:
  selecting the state from among a key-on state in which a throttle is inactivated, a startup state in which the throttle is activated, and a traveling state, wherein the startup state is divided into a startup stop state in which predetermined power is supplied to a motor of the electric vehicle but the electric vehicle is stationary, and a startup safety state in which a driver is judged to be unaware of an idling state of the electric vehicle;
  determining whether to enter the startup stop state from the key-on state, and determining whether to enter the startup safe state from the startup stop state;
  entering the traveling state when a traveling signal is checked in a startup stop state;
  entering the startup safety state when the traveling signal is not checked for a first reference time;
  returning to the startup stop state when a releasing signal is checked in the startup safety state;
  entering the startup stop state when a startup signal is detected in the key-on state; and
  entering a key-on state when it is determined that the driver has no intention to drive, and notifying the driver of the startup stop state when the electric vehicle returns to the startup stop state from the startup safety state, when the releasing signal is not checked in the startup safety state for a second reference time.

14. The electric vehicle state control method of claim 13, further comprising:
  notifying the driver of the traveling state when the electric vehicle enters the traveling state.

15. The electric vehicle state control method of claim 13, wherein a capacitor embedded in an inverter of the electric vehicle is kept charged in the startup stop state and the startup safety state.

16. The electric vehicle state control method of claim 13, wherein the entering of the key-on state when the releasing signal is not checked in the startup safety state for the second reference time comprises:
  checking whether a short reference time elapses;
  checking whether a driver position is a predetermined distance or more when the short reference time elapses and changing a vehicle state to the key-on state when the driver position is the predetermined distance or more; and
  changing the vehicle state to the key-on state when a long reference time elapses even when the driver position is within the predetermined distance.

* * * * *